UNITED STATES PATENT OFFICE.

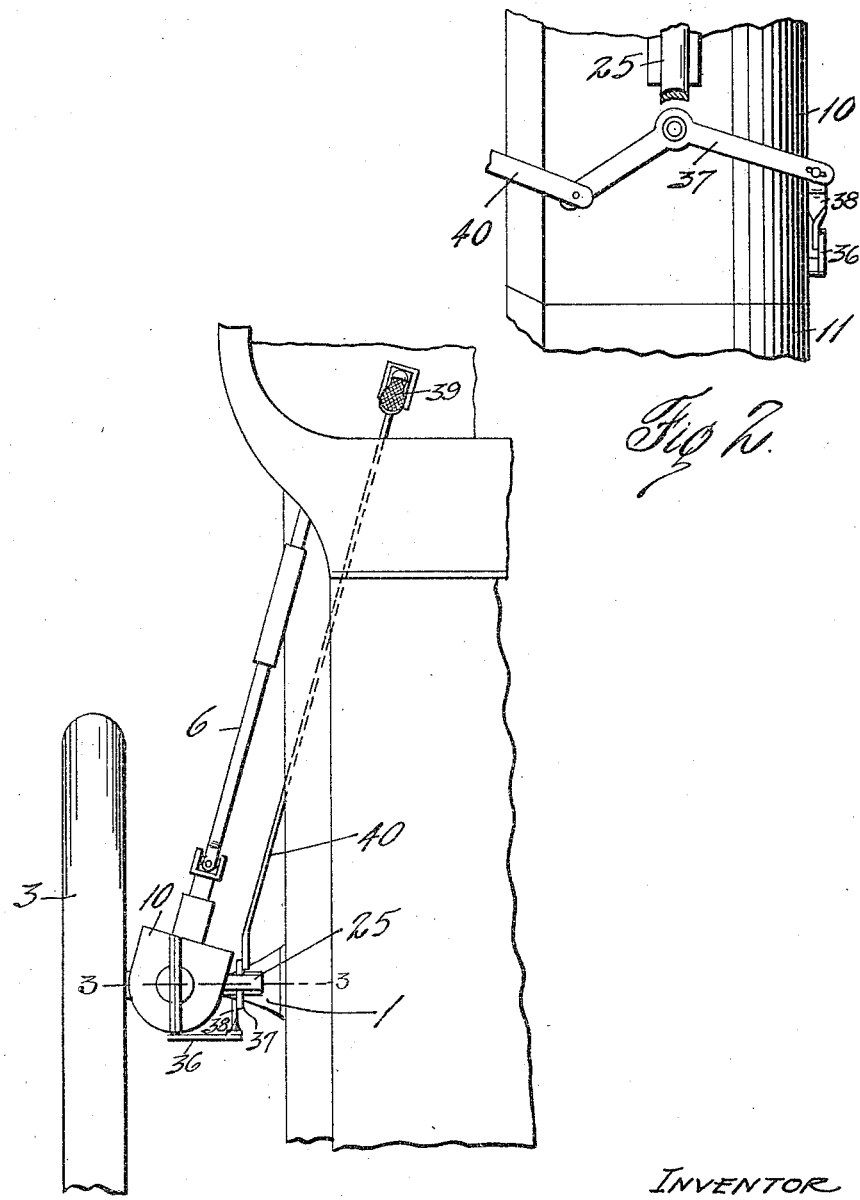

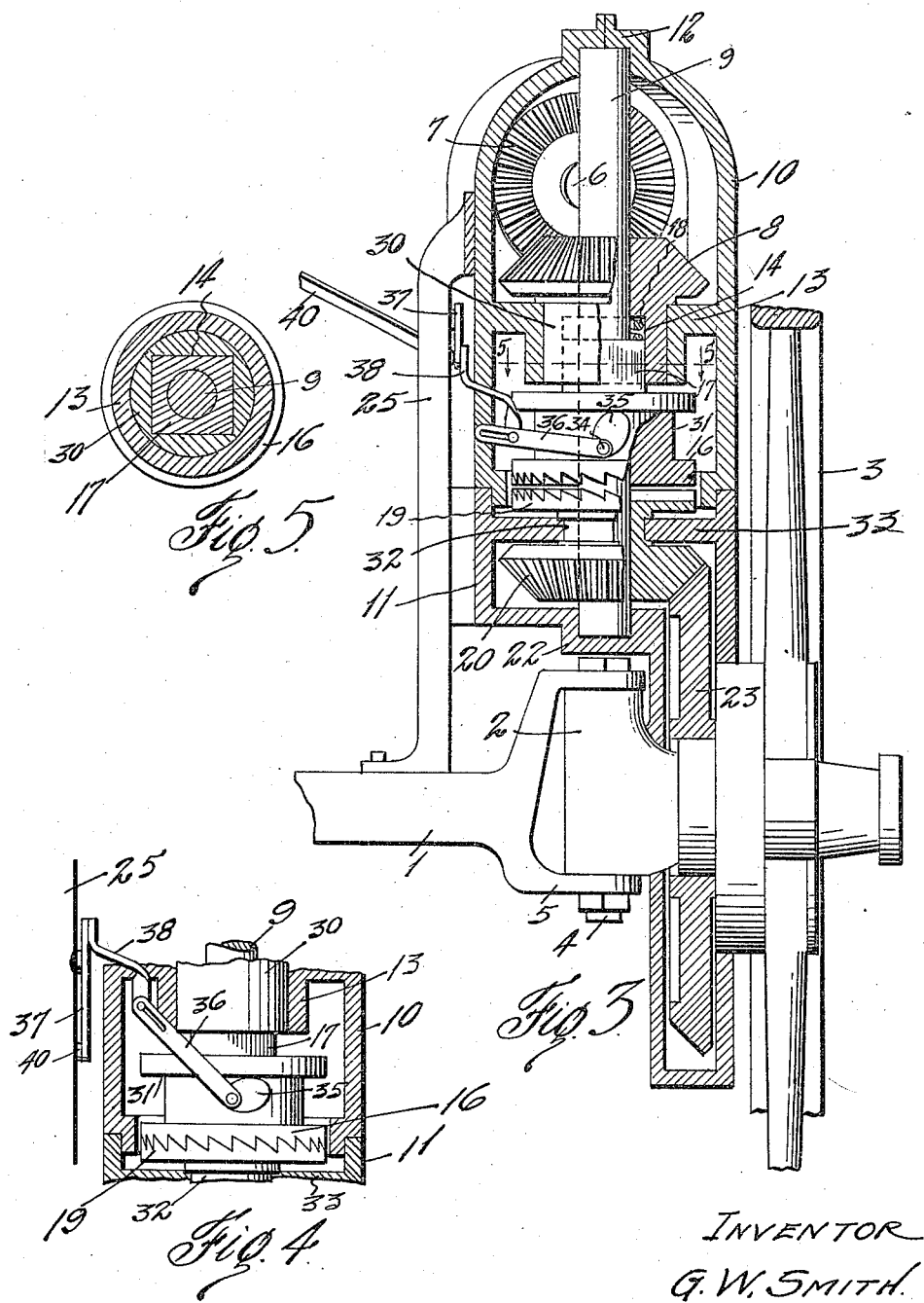

GEORGE W. SMITH, OF DALLAS, TEXAS.

RATCHET-RELEASE FOR FRONT-WHEEL DRIVES.

1,294,721.  Specification of Letters Patent.  Patented Feb. 18, 1919.

Application filed September 28, 1918. Serial No. 256,116.

*To all whom it may concern:*

Be it known that I, GEORGE W. SMITH, a citizen of the United States, residing at Dallas, in the county of Dallas and State of Texas, have invented certain new and useful Improvements in Ratchet - Releases for Front-Wheel Drives, of which the following is a specification.

This invention relates to new and useful improvements in ratchet releases for front wheel drives.

This invention is an improvement on the invention covered by my Letters Patent issued July 3, 1917, No. 1,232,402, but is not limited in its application to the structure illustrated in said patent.

It is obvious that the wheel being propelled in a direction by means of its gears cannot be swung in a direction which would cause the ratchet teeth to lock. It is equally apparent that by providing means for disengaging the ratchet faces the wheel may be freely swung and my improvement has to do particularly with mechanism for raising one of the ratchet members out of engagement with the other so that the transmission of motion to the wheel is interrupted and the latter is free to be swung in a direction which would otherwise cause the ratchet teeth to lock. It is obvious that such a result could be obtained through the agency of various means and instrumentalities.

The invention will be more readily understood from a reading of the following specification and by reference to the accompanying drawings, in which an example of the invention is illustrated, and wherein—

Figure 1 is a partial plan view of the forward right-hand side of an automobile showing my invention applied thereto, Fig. 2 is a detail of the lever mechanism, Fig. 3 is a transverse sectional view on the line 3—3 of Fig. 1, but actuating levers however being added in elevation and certain parts within the housing also being shown in elevation, Fig. 4 is a detail showing the ratchet members in engagement, and Fig. 5 is a cross sectional detail on the line 5—5 of Fig. 3.

In the drawings the numeral 1 designates one end of the front axle of a motor vehicle, 2 the steering knuckle and 3 one of the front wheels of the vehicle, said parts being of the usual construction and arrangement, the knuckle 2 being mounted on the substantial vertical pivot shaft 4 carried by the arms 5 of the forked end of the axle 1.

A bevel-gear 7 is disposed within the upper section 10 of the housing and is driven by a tumbling shaft 6 which is suitably driven by the engine of the motor vehicle. The gear 7 meshes with and drives a second gear 8. The parts described are operated as set forth in the Letters Patent before referred to and throughout this specification the same numerals have been applied to corresponding parts which are used in said Letters Patent. The gear 8 rotates on a vertical spindle 9 which latter has its upper end engaging in a bearing step 12 of the upper section 10 of the housing, while its lower end is supported in a bearing step 22 in the bottom of the lower section 11 of the housing. A bearing support 13 for the gear 8 is formed integral with the section 10. The gear 8 has a depending sleeve 30 engaging in said bearing and this sleeve is formed in its bottom with a recess 14 angular in cross section. Located under the support 13 and the sleeve is a ratchet member 16 having a peripheral groove 31. The member 16 has an upstanding angular boss 17 slidably engaging in the recess 14 and bearing against a spring 18 confined in said recess.

A clutch member 19 is disposed under the member 16 and is free to rotate on the spindle. This member 19 is connected with a bevel-gear 20 reversely disposed in relation to the gear 8. The shank 32 is supported in a web plate 33. The gear 20 drives a bevel-gear 23 which bears a fixed relation to the adjacent steering wheel 3 to which it is suitably secured. The housing is supported by an upright bracket 25 rising from the axle 1 and fastened to the section 10.

By observing Fig. 4 it will be seen that the members 16 and 19 are in engagement and while the spring 18 would yield to permit a relative movement of the members, it is obvious that the member 16 would have to be raised out of engagement with the member 19 so that the wheel could be turned. For accomplishing this I mount a shaft 34 radially in the wall of the housing so as to extend therethrough. On the inner end of the shaft an eccentric 35 engages in the groove 31. A lever 36 arranged exteriorly of the housing has one end fastened on the shaft 34. The normal position of the lever 36 is shown in Fig. 4 and by swinging the lever downwardly to the position shown in Fig. 3 the eccentric 35 is swung upward and the member 16 raised. It is obvious that various means could be employed for swinging the lever 36, and I have illustrated only one of these constructions. A bell crank lever 37 is mounted on the bracket 25 adjacent to section 10 and has connection by means of a twisted link 38 with the slotted end of the lever 36. A rod or bar 40 leads from the opposite end of the bell crank lever and is suitably attached to a foot pedal 39 mounted in the floor of the automobile, the connection with the foot pedal being such that when said pedal is depressed the part 40 will be moved forward thus swinging the bell crank lever so that the link 38 will be carried downward thus swinging the lever 36 downward and raising the eccentric 35. When the member 16 is raised the member 19 may be rotated freely in any direction and thus the wheel 3 may be swung as desired. It is necessary to swing the wheel 3 both when the car is traveling and when it is stationary. It will be seen that in manipulating the car to drive it out of or into a limited space it will be necessary to swing the front wheels and therefore the ratchet members must be disengaged.

What I claim; is,

1. In a front wheel drive, the combination with the steering wheel and the steering knuckle of a motor vehicle, a driving gear imparting motion to the wheel, power transmitting gears imparting motion to the driving gear, a clutch device interposed between the power transmission gears and including ratchet members attached to each of said transmitting gears and arranged to be disengaged and to permit a relative movement of the transmitting gears, of means for displacing one of the ratchet members of the clutch device away from the other ratchet member whereby the last named ratchet member is free to rotate independently and whereby the steering wheel may be swung without locking the ratchet teeth.

2. In a front wheel drive, the combination with the steering wheel and the steering knuckle of a motor vehicle, a driving gear imparting motion to the wheel, power transmitting gears imparting motion to the driving gear, a clutch device interposed between the power transmission gears and including ratchet members attached to each of said transmitting gears and arranged to be disengaged and to permit a relative movement of the transmitting gears, of an eccentric for raising one of the ratchet members out of engagement with the other, and means for operating said eccentric.

3. In a front wheel drive, the combination with the steering wheel and the steering knuckle of a motor vehicle, a driving gear imparting motion to the wheel, power transmitting gears imparting motion to the driving gear, a clutch device interposed between the power transmission gears and including ratchet members attached to each of said transmitting gears and arranged to be disengaged and to permit a relative movement of the transmitting gears, of an eccentric for raising one of the ratchet members of the clutch device out of engagement with the other ratchet member, lever connections for operating said eccentric, and a foot pedal attached to said lever connections.

In testimony whereof I affix my signature.

GEORGE W. SMITH.

Copies of this patent may be obtained for five cents each, by addressing the "Commissioner of Patents, Washington, D. C."